United States Patent [19]
Schwertfeger et al.

[11] Patent Number: 5,888,425
[45] Date of Patent: Mar. 30, 1999

[54] PROCESS FOR THE PREPARATION OF MODIFIED AEROGELS, AND THEIR USE

[75] Inventors: Fritz Schwertfeger, Frankfurt; Andreas Zimmermann, Griesheim, both of Germany

[73] Assignee: Hoechst Aktiengesellschaft, Frankfurt, Germany

[21] Appl. No.: 894,040

[22] PCT Filed: Jan. 26, 1996

[86] PCT No.: PCT/EP96/00308

§ 371 Date: Jul. 24, 1997

§ 102(e) Date: Jul. 24, 1997

[87] PCT Pub. No.: WO96/22942

PCT Pub. Date: Aug. 1, 1996

[30] Foreign Application Priority Data

Jan. 27, 1995 [DE] Germany .................. 195 02 453.2

[51] Int. Cl.$^6$ .................. C01B 36/16; B01J 13/00; B01D 3/34
[52] U.S. Cl. .................. 252/315.2; 252/315.6; 423/338; 427/220; 428/405; 502/233
[58] Field of Search .................. 252/315.2, 315.6; 501/12; 423/338; 428/405; 427/219, 220; 502/233

[56] References Cited

U.S. PATENT DOCUMENTS

| | | | |
|---|---|---|---|
| 3,472,888 | 10/1969 | Bazouin et al. | 556/470 |
| 4,190,457 | 2/1980 | McDaniel | 423/338 |
| 4,954,327 | 9/1990 | Blount | 252/315.6 |
| 5,122,291 | 6/1992 | Wolff et al. | 252/315.6 |
| 5,275,796 | 1/1994 | Tillotson et al. | 423/338 |
| 5,565,142 | 10/1996 | Deshpande et al. | 252/315.2 |
| 5,647,962 | 7/1997 | Jansen et al. | 423/338 |
| 5,680,713 | 10/1997 | Forbet et al. | 34/342 |
| 5,705,535 | 1/1998 | Jansen et al. | 252/315.6 |
| 5,746,992 | 5/1998 | Yoldas et al. | 423/338 |
| 5,759,506 | 6/1998 | Jansen et al. | 423/338 |
| 5,795,556 | 8/1998 | Jansen et al. | 423/338 |
| 5,811,031 | 9/1998 | Jansen et al. | 252/315.6 |

FOREIGN PATENT DOCUMENTS

| | | |
|---|---|---|
| 2152977 | 12/1995 | Canada . |
| 0690023 | 1/1996 | European Pat. Off. . |
| 682574 | 11/1952 | United Kingdom . |

OTHER PUBLICATIONS

Agnew. Chem. International Edition. vol. 8, No. 12 (1969), pp. 974–975.
Revue de Physique Appliquee, Colloque C4, pp. 215–220, Apr. 1989.

Primary Examiner—Richard D. Lovering
Assistant Examiner—Daniel S. Metzmaier
Attorney, Agent, or Firm—Frommer Lawrence & Haug LLP

[57] ABSTRACT

The invention relates to a process for the production of modified $SiO_2$ aerogels in which a) a silicatic lyogel is prepared,
b) if desired, the lyogel prepared in step a) is subjected to a solvent exchange with another organic solvent,
c) the gel obtained in step a) or b) is reacted with at least one chlorine-free silylating agent, and
d) the gel obtained in step c) is dried subcritically,
wherein the chlorine-free silylating agent is a compound of the formula I

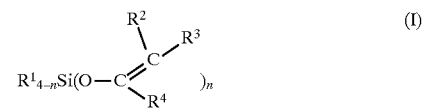

wherein each $R^1$ is identical or different and is selected from a group consisting of linear $C_1$–$C_6$-alkyl radicals, branched $C_1$–$C_6$-alkyl radicals, cyclohexyl radicals and phenyl radicals,
$R^2$, $R^3$ and $R^4$ are identical or different and are selected from the group consisting of hydrogen atoms, linear $C_1$–$C_6$-alkyl radicals, branched $C_1$–$C_6$-alkyl radicals, cyclohexyl radicals and phenyl radicals;
and n=1, 2 or 3.

13 Claims, No Drawings

PROCESS FOR THE PREPARATION OF MODIFIED AEROGELS, AND THEIR USE

RELATED APPLICATIONS

This application is a §371 of PCT/EP96/00308, filed Jan. 26, 1996, based on Fed. Rep. Germany Application No. 195 02 453.2, filed Jan. 27, 1995.

BACKGROUND OF THE INVENTION

The invention relates to a process for the preparation of modified aerogels and to their use.

Aerogels, especially those with porosities above 60% and densities below 0.6 g/cm$^3$, have an extremely low thermal conductivity and are therefore used as thermal insulation material, as described, for example, in EP-A-0 171 722.

Aerogels in the wider sense, i.e. in the sense of "gel with air as dispersion medium", are prepared by drying a suitable gel. The term "aerogel" in this sense includes aerogels in the narrower sense, xerogels and cryogels. A dried gel is described as an aerogel in the narrower sense if the gel liquid is removed at temperatures above the critical temperature and starting from pressures above the critical pressure. If, in contrast, the gel liquid is removed subcritically, for example with formation of a liquid-vapor boundary phase, then the resultant gel is described as a xerogel. It should be pointed out that the novel gels are aerogels in the sense of gels with air as dispersion medium. However, since these gels are prepared by subcritical drying, they could also be described as xerogels.

$SiO_2$ aerogels may be prepared, for example, by acid hydrolysis of tetraethyl orthosilicate in ethanol. The hydrolysis gives a gel whose structure is determined, inter alia, by the temperature, the pH and the duration of the gelling process. However, the gel structure generally collapses when the wet gels are dried, since the capillary forces which arise during the drying are extremely large. The collapse of the gel can be inhibited by carrying out the drying above the critical temperature and the critical pressure of the solvent. Since the liquid/gaseous phase boundary disappears in this region, the capillary forces no longer apply and the gel does not undergo any change during the drying, i.e. there is also no shrinkage of the gel during the drying. Preparation processes based on this drying technique are known, for example, from EP-A-0 396 076 and WO 92/03378. However, this technique requires, for example if ethanol is used, a temperature of about 240° C. and pressures of above 60 bar. If ethanol is exchanged for $CO_2$ before the drying, the drying temperature is lowered to about 30° C., but the required pressure is then above 70 bar.

An alternative to the abovementioned drying is given by a process for subcritical drying of $SiO_2$ gels, if these are reacted with a chlorine-containing silylating agent before drying. The $SiO_2$ gel here can be obtained, for example, by acid hydrolysis of tetraalkoxysilanes, preferably tetraethoxysilane (TEOS), using water in a suitable organic solvent, preferably ethanol. After exchanging the solvent for a suitable organic solvent, the gel obtained is reacted, in a further step, with a chlorine-containing silylating agent. Methylchlorosilanes ($Me_{4-n}SiCl_n$ with n=from 1 to 3) are preferably used as silylating agent, because of their reactivity. The resultant $SiO_2$ gel, which is modified on the surface with methylsilyl groups, can then be dried from an organic solvent in air. In this way, aerogels with densities below 0.4 g/cm$^3$ and porosities above 60% can be attained. The preparation process based on this drying technique is described in detail in WO 94/25149.

To increase the strength of the gel structure, the above-described gels can also be mixed and aged with tetraalkoxysilanes in the alcoholic aqueous solution, before drying, as disclosed in WO 92/20623.

However, the tetraalkoxysilanes used as starting materials in the above-described processes are exceptionally costly. In addition, during the silylation with chlorine-containing silylating agents, large amounts of hydrogen chloride (HCl) and a wide variety of by-products associated with it are inevitably produced and these by-products may require a very complicated and costly purification of the silylated $SiO_2$ gels by repeated washing with a suitable organic solvent. The especially corrosion-resistant production plants associated with this are likewise very expensive. The safety risk associated with the production of very large quantities of HCl gas, in addition, requires very complicated engineering and is therefore likewise very costly.

A first and not insignificant cost reduction can be achieved by using waterglass as starting material for the preparation of the $SiO_2$ gels. For example, using an ion-exchange resin and starting with an aqueous waterglass solution, a silica can be prepared which polycondenses on addition of a base to give an $SiO_2$ gel. After exchanging the aqueous medium for a suitable organic solvent, the gel obtained is then reacted, in a further step, with a chlorine-containing silylating agent. Methylchlorosilanes ($Me_{4-n}SiCl_n$ with n=from 1 to 3) are likewise preferably used as silylating agent, because of their reactivity. The resultant $SiO_2$ gel, which is modified on the surface with methylsilyl groups, can likewise then be dried from an organic solvent in air. The preparation process based on this technique is known from DE-A-43 42 548.

The problems, described earlier, of the exceptionally high process costs associated with the use of chlorine-containing silylating agents are, however, not solved by using waterglass as starting material.

BRIEF SUMMARY OF THE INVENTION

It is therefore the object of the present invention to provide a process for the preparation of modified $SiO_2$ aerogels which does not have the disadvantages of the prior art, for example the formation of elimination products or even reaction products which have safety or process problems and associated with this also cause high process costs.

This object is achieved by means of a process for the preparation of aerogels in which a) a silicatic lyogel is prepared, b) if desired, the lyogel prepared in step a) is subjected to a solvent exchange with another organic solvent, c) the gel obtained in step a) or b) is reacted with at least one silylating agent, and d) the silylated gel obtained in step c) is dried subcritically, which comprises, in step c), reacting the gel obtained in step a) or b) with at least one chlorine-free silylating agent of the formula I,

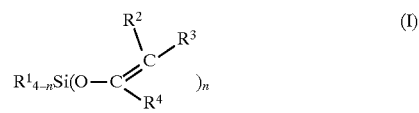

where each $R^1$, identically or differently, is a linear or branched $C_1$–$C_6$-alkyl radical, a cyclohexyl radical or a phenyl radical, $R^2$, $R^3$ and $R^4$ are identical or different and are hydrogen atoms, linear or branched $C_1$–$C_6$-alkyl radicals, cyclohexyl radicals or phenyl radicals, and n=1, 2 or 3.

In a preferred embodiment, in step a) a silicatic lyogel is prepared which is obtainable by hydrolysis and condensation of Si alkoxides in an organic solvent, with water (i). The Si alkoxide used is a tetraalkoxysilane, preferably tetraethoxy- or tetramethoxysilane. The organic solvent here is preferably an alcohol, particularly preferably ethanol or methanol, to which up to 20% by volume of water may have been added. In the hydrolysis and condensation of the Si alkoxides in an organic solvent with water, acids and/or bases may be added as catalysts in a one- or two-stage step. In a particularly preferred embodiment, in step a) a silicatic lyogel is prepared by using an acid ion-exchange resin or a mineral acid to bring an aqueous waterglass solution to a pH of $\leq 3$, adding a base to polycondense the resultant silica to give an $SiO_2$ gel and, if a mineral acid was used, washing the gel with water until it is substantially free of electrolytes (ii). Sodium waterglass and/or potassium waterglass are generally used. The ion-exchange resin is preferably an acid resin, those which contain sulfonic acid groups being especially suitable. If mineral acids are used, hydrochloric acid and sulfuric acid are especially suitable. The base used is generally $NH_4OH$, $NaOH$, $KOH$, $Al(OH)_3$ and/or colloidal silica. If a mineral acid was used, the $SiO_2$ gel produced using the base is washed with water until it is substantially free of electrolytes. It is preferable to continue washing until the discharged wash water has the same electrical conductivity as demineralized water. It is preferable to allow the gel to age before washing, to be precise generally at from 20° to 100° C., preferably at from 40° to 100° C. and particularly preferably at from 80° to 100° C., and at a pH of from 4 to 11, preferably from 5 to 9. The time for this is generally from 1 second to 48 hours, preferably from 1 second to 3 hours.

The lyogel obtained in (i) or (ii) is washed with an organic solvent until the water content of the gel is less than 5% by weight, preferably less than 2% by weight, and particularly preferably less than 1% by weight. The solvents used are generally aliphatic alcohols, ethers, esters or ketones, or aliphatic or aromatic hydrocarbons. Preferred solvents are methanol, ethanol, acetone, tetrahydrofuran, ethyl acetate, dioxane, n-hexane and toluene. Acetone is particularly preferred as solvent. It is also possible, however, to use mixtures of the abovementioned solvents. Furthermore, the water may firstly be washed out with a water-miscible alcohol and then this may be washed out with a hydrocarbon.

Step a) is generally carried out at a temperature between the freezing point of the solution and 70° C.

The lyogel prepared in step a) may moreover be prepared starting from silicatic compounds as described above which additionally contain zirconium, aluminium and/or titanium compounds capable of condensation.

The organic solvents used in step b) are in general, aliphatic alcohols, ethers, esters or ketones, or aliphatic or aromatic hydrocarbons. It is also possible to use mixtures of the abovementioned solvents. Preferred solvents are methanol, ethanol, propanol, acetone, tetrahydrofuran, ethyl acetate, dioxane, n-hexane, n-heptane and toluene. Acetone is particularly preferably used as solvent in step b).

In step c), the solvent-containing gel is reacted with at least one chlorine-free silylating agent of the formula (I),

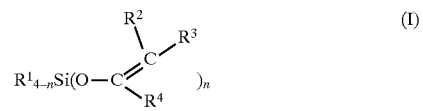

where each $R^1$, identically or differently, is a linear or branched $C_1-C_6$-alkyl radical, a cyclohexyl radical or a phenyl radical, $R^2$, $R^3$ and $R^4$ are identical or different and are hydrogen atoms, linear or branched $C_1-C_6$-alkyl radicals, cyclohexyl radicals or phenyl radicals, and n=1, 2 or 3.

$R^1$ is preferably a methyl or ethyl group, each of $R^2$, $R^3$ and $R^4$, identically or differently, is preferably a hydrogen atom or a methyl group and n is preferably 1 or 2.

Trimethylisopropenoxysilane ($R^1=CH_3$, $R^2=R^3=H$, $R^4=CH_3$ and n=1) is particularly preferred.

Trimethylisopropenoxysilane, like most of the other silylation agents according to the invention, is either commercially available or can be prepared by processes known from the literature. A relevant disclosure is found, for example, in DE-A-12 48 049.

The reaction is preferably carried out at from −20° to 100° C. in an organic solvent; in particular, those solvents are used which are employed for washing in step a) and solvent exchange in step b). Acetone is particularly preferred.

In a preferred embodiment, the system is mixed with small amounts of at least one acid, before or during the silylation, in order to accelerate the silylation reaction. Inorganic acids or acetic acid are preferred for this purpose.

It is moreover also possible to add other silylating agents, in order to accelerate the silylation reaction. Suitable compounds for this are silanes of the formula $R^1_{4-n}SiCl_n$ with n=from 1 to 3, where $R^1$ and $R^2$, independently of one another, are $C_1-C_6$-alkyl, cyclohexyl or phenyl. Trimethylchlorosilane is preferably used.

The amounts are generally from 0 to 1% by weight (based on the lyogel), concentrations of from 0 to 0.5% by weight being preferred and those of from 0 to 0.2% by weight being particularly preferred.

In the reaction of the gel with the chlorine-free silylating agents according to the invention, of the formula I, α-unsaturated alcohols are formed which immediately convert into the corresponding ketones or aldehydes (keto-enol tautomerism). When trimethylisopropenoxysilane is used, acetone is produced in this manner as the sole elimination product, which is identical with the particularly preferred solvent.

When the elimination product is identical with the solvent employed, for example in the case of acetone, all of the purification steps associated with the silylation for the purposes of solvent and product work-up can be dispensed with. In spite of this, it may be advantageous under certain circumstances to wash the silylated gel, before drying, with a protic or aprotic solvent, using in particular those solvents which are also employed for washing in step a) and solvent exchange in step b).

A further advantage of the novel process is that in the silylation with the chlorine-free silylating agents according to the invention no HCl gas is produced, and also therefore no corrosive under certain circumstances chlorine-containing by-products.

In step d), the silylated gel is dried subcritically, preferably at temperatures of from −30° to 200° C., particularly preferably from 0° to 100° C., and pressures of from 0.001 to 20 bar, particularly preferably from 0.01 to 5 bar, in particular from 0.1 to 2 bar, for example by radiation, convection and/or contact drying. The drying is generally continued until the gel has a residual solvent content of less than 0.1% by weight. The aerogels obtained during the drying are permanently hydrophobic.

In a further embodiment, the gel may be comminuted by techniques known to the person skilled in the art, for example milling, after it has been shaped in the polycondensation in step a) and/or after every subsequent process step.

IR opacifiers, such as carbon black, titanium dioxide, iron oxides and/or zirconium dioxide, may, furthermore, be added to the sol before preparation of the gel, in order to reduce the radiant contribution to the thermal conductivity.

In a further embodiment, the gel may, depending on application, also be subjected to a structure reinforcement before the silylation. This may be carried out, for example, by reacting the gel obtained with a solution of an alkyl and/or aryl orthosilicate which is capable of condensation and has the formula $R^1_{4-n}Si(OR^2)_n$, where n=from 2 to 4 and $R^1$ and $R^2$, independently of one another, are linear or branched $C_1$–$C_6$-alkyl radicals, cyclohexyl radicals or phenyl radicals, or with an aqueous silica solution.

For many applications of aerogels in which other components are added before the surface modification, it is particularly advantageous to be able to dispense with a very acid silylation, as in the case of chlorosilanes, without losing the effectiveness of the surface modification.

The novel process is described in more detail below, using working examples.

DESCRIPTION OF THE PREFERRED EMBODIMENTS

EXAMPLE 1

1 l of a sodium waterglass solution (with a content of 7% by weight of $SiO_2$ and an $Na_2O:SiO_2$ ratio of 1:3.3) was stirred together with 0.5 l of an acid ion-exchange resin (styrene-divinylbenzene copolymer with sulfonic acid groups, commercially available under the name ®Duolite C20), until the pH of the aqueous solution was 2.7. The ion-exchange resin was then filtered off and the aqueous solution was adjusted to a pH of 4.7 using 1 molar NaOH solution. The resultant gel was then aged for 3 hours at 85° C. and then the water was extracted with 3 l of acetone. The acetone-containing gel was then silylated with trimethylisopropenoxysilane (50 mg of trimethylisopropenoxysilane per gram of wet gel). The gel was dried in air (3 hours at 40° C., then 2 hours at 50° C. and 12 hours at 150° C.).

The transparent aerogel thus obtained had a density of 0.15 g/cm³. The BET specific surface area was 780 m²/g. The λ value was 0.018 W/mK.

The thermal conductivity was measured by a hot wire method (see e.g. O. Nielsson, G. Rüschenpöhler, J. Groβ, J. Fricke, High Temperatures—High Pressures, Vol. 21, 267–274 (1989)).

EXAMPLE 2

1 l of a sodium waterglass solution (with a content of 7% by weight of $SiO_2$ and an $Na_2O:SiO_2$ ratio of 1:3.3) was stirred together with 0.5 l of an acid ion-exchange resin (styrene-divinylbenzene copolymer with sulfonic acid groups, commercially available under the name ®Duolite C20), until the pH of the aqueous solution was 2.7. The ion-exchange resin was then filtered off and the aqueous solution was adjusted to a pH of 4.7 using 1 molar NaOH solution. The resultant gel was then aged for 3 hours at 85° C. and then an acetone solvent exchange was carried out using 3 liters of acetone. The acetone-containing gel was then silylated with trimethylisopropenoxysilane (50 mg of trimethylisopropenoxysilane per gram of wet gel). The gel was dried in air (3 hours at 40° C., then 2 hours at 50° C. and 12 hours at 150° C.).

The transparent aerogel thus obtained had a density of 0.145 g/cm³. The BET specific surface area was 690 m²/g. The λ value was 0.017 W/mK.

The thermal conductivity was measured by a hot wire method (see e.g. O. Nielsson, G. Rüschenpöhler, J. Groβ, J. Fricke, High Temperatures—High Pressures, Vol. 21, 267–274 (1989)).

EXAMPLE 3

1 l of a sodium waterglass solution (with a content of 7% by weight of $SiO_2$ and an $Na_2O:SiO_2$ ratio of 1:3.3) was stirred together with 0.5 l of an acid ion-exchange resin (styrene-divinylbenzene copolymer with sulfonic acid groups, commercially available under the name ®Duolite C20), until the pH of the aqueous solution was 2.7. The ion-exchange resin was then filtered off and the aqueous solution was adjusted to a pH of 4.7 using 1 molar NaOH solution. The resultant gel was then aged for 3 hours at 85° C. and then an isopropanol solvent exchange was carried out using 3 liters of isopropanol. The isopropanol-containing gel was then silylated with 5% by weight of trimethylisopropenoxysilane and 0.1% by weight of trimethylchlorosilane (data based on the wet gel). The gel was dried in air (3 hours at 40° C., then 2 hours at 50° C. and 12 hours at 150° C.).

The transparent aerogel thus obtained had a density of 0.13 g/cm³. The BET specific surface area was 563 m²/g. The λ value was 0.015 W/mK.

The thermal conductivity was measured by a hot wire method (see e.g. O. Nielsson, G. Rüschenpöhler, J. Groβ, J. Fricke, High Temperatures—High Pressures, Vol. 21, 267–274 (1989)).

We claim:

1. A process for the preparation of aerogels in which
   a) a silicatic lyogel is prepared,
   b) if desired, the lyogel prepared in step a) is subjected to a solvent exchange with another organic solvent,
   c) the gel obtained in step a) or b) is reacted with at least one silylating agent, and
   d) the silylated gel obtained in step c) is dried subcritically, which comprises, in step c), reacting the gel obtained in step a) or b) with at least one chlorine-free silylating agent of the formula I,

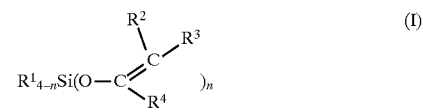

wherein each $R^1$ is identical or different and is selected from the group consisting of linear $C_1$–$C_6$-alkyl radicals, branched $C_1$–$C_6$-alkyl radicals, cyclohexyl radicals and phenyl radicals; $R^2$, $R^3$ and $R^4$ are identical or different and selected from the group consisting of hydrogen atoms, linear $C_1$–$C_6$-alkyl radicals, branched $C_1$–$C_6$-alkyl radicals, cyclohexyl radicals and phenyl radicals; and n=1, 2 or 3.

2. The process as claimed in claim 1, wherein a silicatic lyogel is prepared by hydrolysis and condensation of Si alkoxides in an organic solvent, with water, and the gel obtained is then washed with an organic solvent until the water content of the gel is ≦5% by weight.

3. The process as claimed in claim 1, wherein a silicatic lyogel is prepared by using an acid ion-exchange resin or a mineral acid to bring an aqueous waterglass solution to a pH of ≦3, adding a base to polycondense the resultant silica to give an $SiO_2$ gel, and, if a mineral acid was used, washing the gel with water until it is free of electrolytes, and then washing the gel obtained with an organic solvent until the water content of the gel is ≦5% by weight.

4. The process as claimed in claim 3, wherein the base is selected from the group consisting of $NH_4OH$, NaOH, KOH, $Al(OH)_3$ and colloidal silica.

5. The process as claimed in claim 1, wherein the $SiO_2$ gel obtained in step a) is allowed to age at from 20° to 100° C. and at a pH of from 4 to 11 for a period of from 1 second to 48 hours before it is washed.

6. The process as claimed in claim 1, wherein, in step b), the organic solvent used is methanol, ethanol, propanol, acetone, tetrahydrofuran, ethyl acetate, dioxane, n-hexane and/or toluene.

7. The process as claimed in claim 1, wherein the gel obtained in step a) or b) is reacted, before the silylation, with a solution of an alkyl and/or aryl orthosilicate which is capable of condensation and has the formula $R^1_{4-n}Si(OR^2)_n$, where n=from 2 to 4 and $R^1$ and $R^2$, independently of one another, are selected from the group consisting of linear $C_1$–$C_6$-alkyl radicals, branched $C_1$–$C_6$-alkyl radicals, cyclohexyl radicals and phenyl radicals.

8. The process as claimed in claim 1, wherein, in step c), the solvent-containing gel is reacted with at least one chlorine-free silylating agent of the formula (I), wherein $R^1$ is a methyl or ethyl group; $R^2$, $R^3$ and $R^4$ are identical or different and selected from the group consisting of a hydrogen atom and a methyl group; and n=1 or 2.

9. The process as claimed in claim 8, wherein, in step c), wherein the chlorine-free silating agent is trimethylisopropenoxysilane.

10. The process as claimed in claim 1, wherein the reaction in step c) is carried out in an organic solvent at a temperature in the range from −20° to 100° C.

11. The process as claimed in claim 1, wherein the silylated gel obtained in step c) is washed with a protic or aprotic solvent before it is dried in step d).

12. The process as claimed in claim 1, wherein, in step d), the silylated gel is dried at from −30° to 200° C. and at from 0.001 to 20 bar.

13. The process as claimed in claim 1, wherein the gel obtained in step a) or b) is reacted, before the silylation, with an aqueous silica solution.

* * * * *